United States Patent
Durgin et al.

(10) Patent No.: US 10,239,526 B2
(45) Date of Patent: Mar. 26, 2019

(54) ADAPTIVE CRUISE CONTROL SYSTEM

(71) Applicant: GM GLOBAL TECHNOLOGY OPERATIONS LLC, Detroit, MI (US)

(72) Inventors: William F. Durgin, Ann Arbor, MI (US); Cody D. Berman, Ann Arbor, MI (US); Justin K. Francisco, Sterling Heights, MI (US); Brunno L. Moretti, Walled Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/672,624

(22) Filed: Mar. 30, 2015

(65) Prior Publication Data

US 2016/0288789 A1    Oct. 6, 2016

(51) Int. Cl.
| | |
|---|---|
| *B60W 30/16* | (2012.01) |
| *G01S 19/01* | (2010.01) |
| *B60W 30/14* | (2006.01) |
| *B60W 30/18* | (2012.01) |
| *B60W 20/00* | (2016.01) |
| *G01S 13/93* | (2006.01) |
| *G01S 19/14* | (2010.01) |

(52) U.S. Cl.
CPC ............ *B60W 30/16* (2013.01); *B60W 20/00* (2013.01); *B60W 30/143* (2013.01); *B60W 30/18154* (2013.01); *B60W 2420/42* (2013.01); *B60W 2550/22* (2013.01); *B60W 2550/308* (2013.01); *B60W 2550/402* (2013.01); *G01S 19/14* (2013.01); *G01S 2013/9321* (2013.01)

(58) Field of Classification Search
None
See application file for complete search history.

(56) References Cited

U.S. PATENT DOCUMENTS

| | | | | |
|---|---|---|---|---|
| 7,663,505 B2* | 2/2010 | Publicover | ............. | G08G 1/095 340/907 |
| 7,676,324 B2* | 3/2010 | Bae | ........................... | G08G 1/16 340/901 |
| 8,315,775 B2* | 11/2012 | Biondo | ............... | B60W 30/143 180/170 |
| 8,463,521 B2* | 6/2013 | Westendorf | ........... | B60W 30/16 340/439 |
| 8,478,500 B1* | 7/2013 | Vahidi | ....................... | B60T 7/18 340/932 |
| 8,504,275 B2* | 8/2013 | Schwindt | .............. | B60W 30/16 701/301 |
| 8,843,292 B2* | 9/2014 | Heft | ......................... | B60T 7/22 701/70 |
| 8,972,145 B2* | 3/2015 | Mahler | ..................... | G06F 7/00 701/93 |
| 9,069,653 B2* | 6/2015 | Be | ........................... | G06F 17/00 |
| 9,085,301 B2* | 7/2015 | Taguchi | .............. | B60W 30/143 |
| 9,221,463 B2* | 12/2015 | Choi | .................... | B60W 30/146 |
| 2003/0105578 A1* | 6/2003 | Takenaga | ............... | B60W 30/16 701/117 |
| 2010/0305804 A1* | 12/2010 | Taguchi | .................... | G06F 7/00 701/31.4 |

(Continued)

*Primary Examiner* — Thomas G Black
*Assistant Examiner* — Demetra R Smith-Stewart
(74) *Attorney, Agent, or Firm* — Lorenz & Kopf, LLP

(57) ABSTRACT

Systems and processes are provided for adaptive cruise control. The process includes receiving information about a distance between vehicle and a traffic signal, receiving information about a state of the traffic signal, and determining whether to adjust the speed of the vehicle based upon the distance between the vehicle and the traffic signal and the state of the traffic signal.

16 Claims, 2 Drawing Sheets

(56) References Cited

U.S. PATENT DOCUMENTS

| | | | |
|---|---|---|---|
| 2012/0022764 A1* | 1/2012 | Tang | B60W 10/06 |
| | | | 701/102 |
| 2013/0090822 A1* | 4/2013 | Schwindt | B60K 31/0008 |
| | | | 701/70 |
| 2013/0110316 A1 | 5/2013 | Ogawa | |
| 2013/0116861 A1* | 5/2013 | Nemoto | B60W 30/16 |
| | | | 701/2 |
| 2013/0138320 A1* | 5/2013 | Aso | B60W 30/16 |
| | | | 701/96 |
| 2013/0158838 A1* | 6/2013 | Yorke | B60W 10/06 |
| | | | 701/103 |
| 2013/0294124 A1* | 11/2013 | Fujita | H02M 7/04 |
| | | | 363/84 |
| 2013/0297124 A1* | 11/2013 | Be | G06F 17/00 |
| | | | 701/22 |
| 2014/0067220 A1* | 3/2014 | Seiler | B60T 7/12 |
| | | | 701/70 |
| 2014/0303868 A1* | 10/2014 | Otake | G08G 1/166 |
| | | | 701/70 |
| 2015/0025709 A1* | 1/2015 | Spaulding | H04B 10/116 |
| | | | 701/2 |
| 2015/0057906 A1* | 2/2015 | Nefedov | G05D 13/02 |
| | | | 701/93 |
| 2015/0149059 A1* | 5/2015 | Choi | B60W 30/146 |
| | | | 701/96 |
| 2015/0183433 A1* | 7/2015 | Suzuki | B60W 30/16 |
| | | | 701/96 |
| 2016/0097652 A1* | 4/2016 | Liu | G01C 21/3694 |
| | | | 701/423 |
| 2016/0257288 A1* | 9/2016 | Miller | B60T 1/10 |

* cited by examiner

ADAPTIVE CRUISE CONTROL SYSTEM

FIELD

The present disclosure generally relates to the field of vehicles and, more specifically, to methods and systems for adaptively adjusting the speed of a vehicle based upon vehicle to vehicle (V2V) information as well as vehicle to infrastructure (V2I) information.

BACKGROUND

Certain vehicles today may incorporate sensor data received from one or more vehicle sensors to determine a target vehicle speed. This target speed may be communicated to the driver, who may adjust the throttle as needed based upon the feedback provided to the driver by the vehicle system. These systems do not, however, account for a variety of important factors, such as a distance between vehicles in traffic, a distance to a certain object or element of infrastructure (such as a traffic signal), nor do they automatically adjust vehicle torque or speed to maximize fuel efficiency.

Accordingly, it is desirable to provide improved methods and systems for adapting vehicle cruise control and speed or torque features. Furthermore, other desirable features and characteristics of the present invention will be apparent from the subsequent detailed description and the appended claims, taken in conjunction with the accompanying drawings and the foregoing technical field and background.

SUMMARY

A system is provided for adaptive cruise control. The system comprises an external object calculation module (EOCM), the EOCM comprising a processor coupled to a memory and an interface, the memory including instructions for improving a fuel efficiency of the vehicle, a plurality of object detection sensors, and a communication module having a vehicle to vehicle portion (V2V) configured to sense a distance between a first vehicle and a second vehicle and a vehicle to infrastructure portion (V2I) configured to sense a distance between the first vehicle and an infrastructure element. The EOCM receives data via the interface from the communication module and is configured to automatically and adaptively adjust the speed of the vehicle based on the received data to improve the fuel efficiency of the vehicle.

An external object calculation module (EOCM) for improving the fuel efficiency of a vehicle is provided. The EOCM comprises a computer processor, a memory coupled to the computer processor and including instructions for improving the fuel efficiency of the vehicle, and an interface coupled to the computer processor. The computer processor is configured to receive, via the interface, information about the distance between a first vehicle and a second vehicle (V2V data) and information about the state of a traffic signal (V2I data), The processor is further configured to process the instructions stored in the memory based upon the V2V data and the V2I data to improve the fuel efficiency of a vehicle within which the EOCM is situated.

A process is provided for adaptive cruise control. The process comprises receiving information about a distance between vehicle and a traffic signal, receiving information about a state of the traffic signal, and determining whether to adjust the speed of the vehicle based upon the distance between the vehicle and the traffic signal and the state of the traffic signal.

BRIEF DESCRIPTION OF THE DRAWINGS

The present disclosure will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any theory presented in the preceding background or the following detailed description.

Figure 1B:
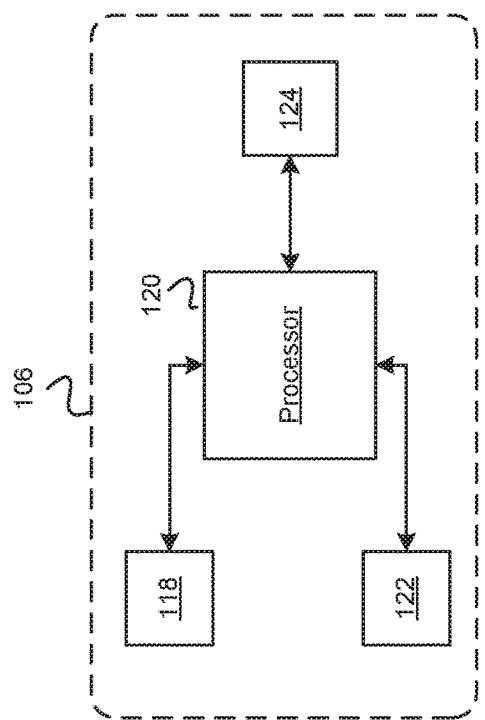
FIG. 1B is a functional block diagram of an external object calculation module in accordance with various embodiments.
Figure 1A:
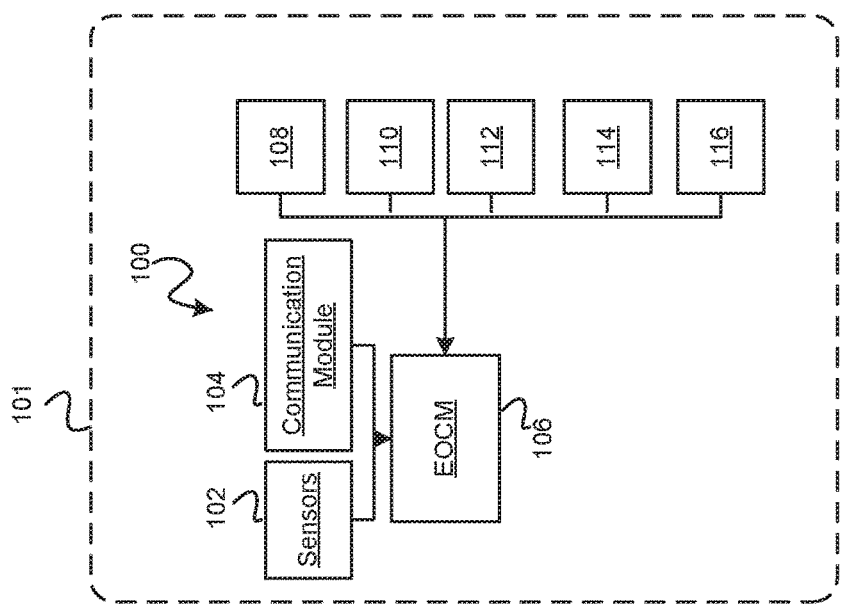
FIG. 1A is a system diagram showing an example adaptive cruise control system in accordance with various embodiments.

With reference to FIG. 1A, an adaptive vehicle 101 cruise control system 100 is shown. The system 100 is incorporated within a vehicle 101, such as within the vehicle's 101 electronics and sensing systems. The system 100 includes a variety of object or infrastructure detection sensors 102, such as, for example, one or more radars, one or more cameras, a GPS system, a sonar system, and any other suitable sensing system.

The system 100 further includes a communication module 104 that is configured to sense, first, the distance from one vehicle 101 to another vehicle 101 (the V2V portion), such as, for example, a vehicle (not shown) in front of the vehicle 101, and, second, the distance from the vehicle 101 to an object or element of infrastructure (e.g., a traffic signal or stop sign) (the V2I portion). The V2I portion may, in addition, sense or detect a state of a traffic signal.

With continuing attention to FIG. 1A and with brief reference to FIG. 1B, the system 100 further includes an external object calculation module (or "EOCM") 106. The EOCM 106 comprises a computer system or controller that includes, in general, a processor 120, a computer-readable memory 118, and at least two interfaces 122 and 124. The memory 118 can be communicatively coupled, as through a bus or other electronic connection to the processor 120. The EOCM 106 is coupled to the object detection sensors 102, such as by the interface 122. The EOCM 106 is further coupled to the V2V and V2I communication modules 104, such as by the interface 122. Thus, the EOCM 106 communicates with the object detection sensors 102 and V2V and V2I communication module 104 via the interface 122 to each of the module 104. The EOCM 106 communicates with a variety of other modules (e.g., modules 108, 110, 112, 114, and 116), as described below, via the interface 124.

Additional sensor data may include, in various embodiments, wheel speed sensor data, hybrid battery sensor data, driver requested torque, driver request brake, map data such as from a GPS or other navigation system, driver destination data, and the like.

The EOCM 106 is configured to process the data received from the communication module 104 and the object detection sensors 102 (as well as the other data, as described above) to account for a variety of factors, such as a distance between vehicles in traffic, a distance to a certain object or element of infrastructure (such as a traffic signal), a state of a traffic signal (e.g., green, yellow, red) as well as to automatically adjust vehicle torque and speed to maximize fuel efficiency based upon the V2V and V2I data. To this end, the EOCM 106 processes instructions stored in the memory 118 via the processor 120. These instructions correspond with the process described below with respect to FIG. 2.

The system 100 further includes a body control module 108, which performs a cruise control process, such as a cruise control process that is well known in the art. The system 100 further includes an engine control module 110 that enables the vehicle engine to be shut off during travel or while the vehicle 101 is stationary to conserve fuel. The system 100 further includes a transmission control module that allows the transmission to transition to (or remain within) an optimal gear based upon the speed of the vehicle 101 or information (such as information input by a driver of the vehicle 101 using a cruise control interface in the dash of the vehicle 101) or a desired speed of the vehicle 101.

Where the vehicle 101 comprises an electric/gasoline hybrid vehicle 101, the system 100 also includes, in various embodiments, a traction power inverter module 114 and a battery state manager 116 which, together, permit the vehicle 101 to conserve energy and fuel by adjusting a time or duration that a battery is utilized to power the vehicle 101. For example, based upon data received from the object detection sensors 102 and V2V and V2I communication module 104 that is processed by the EOCM 106, the system 100 can absorb braking energy (e.g., assume the vehicle 101 is approaching a stopping point) to recharge the battery for a maximum duration.

Figure 2:
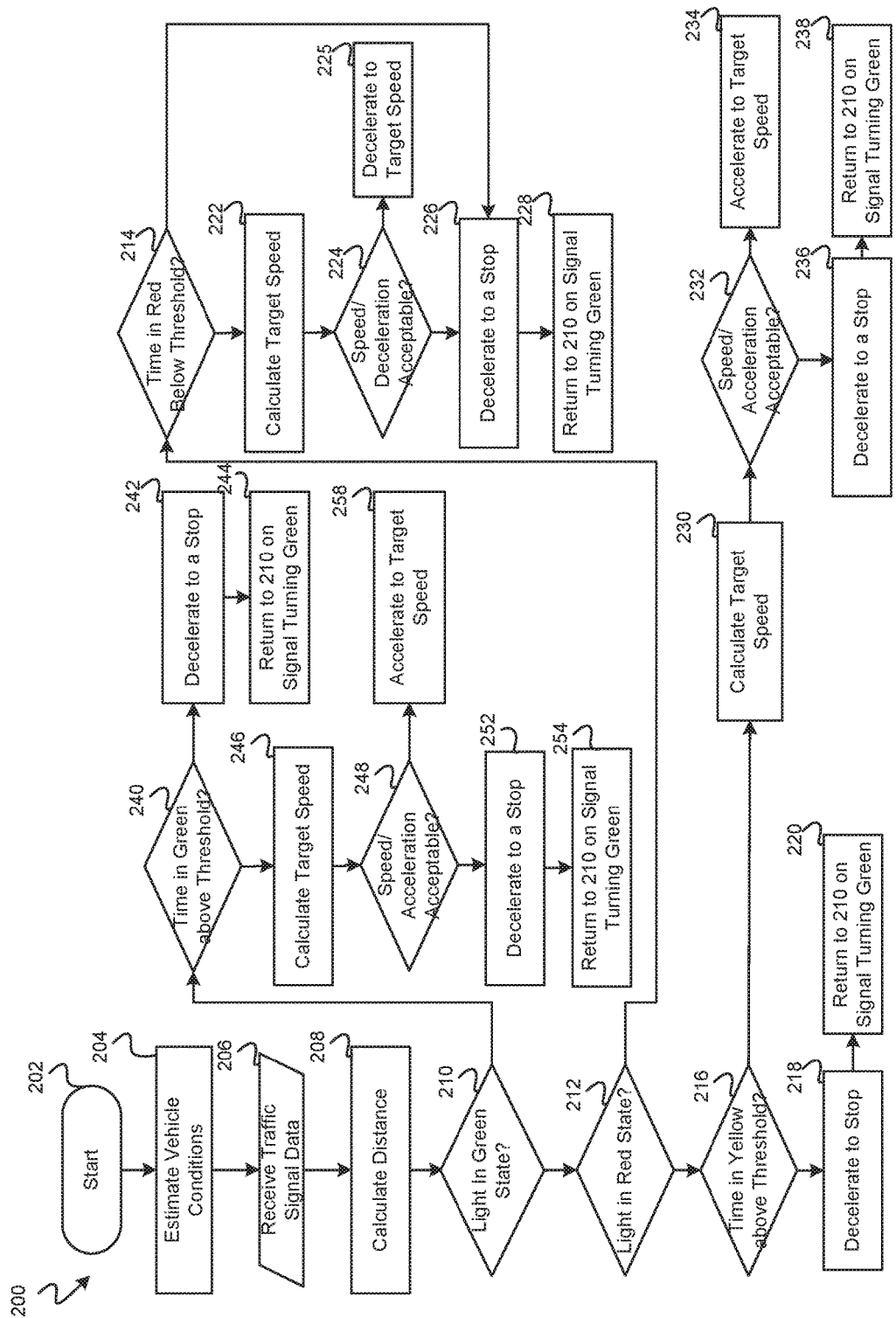
FIG. 2 is a flowchart of an example process for adjusting the operation of a vehicle using the adaptive cruise control system in accordance with various embodiments.

With reference now to FIG. 2, the process 200 for adjusting the operation of a vehicle 101 using the adaptive cruise control system is shown. The process 200 is implemented, as described herein, by system 100 on the EOCM 106, which provides instructions based upon these processing operations to vehicle 101 systems to direct the operation of the vehicle 101 to increase fuel efficiency. The process 200 is discussed in the context of the object or element of infrastructure being a traffic signal. As can be appreciated, the same or similar process 200 can be implemented for other types of objects or elements of infrastructure, such as a stop sign, a pedestrian crossing sign, and the like.

Accordingly, beginning with step 202, the EOCM 106 estimates or calculates a variety of conditions associated with the vehicle 101 based upon the data received and the instructions stored in the memory 118, as described herein, from the various sensors (e.g., the object detection sensors 102, the V2V and V2I communication module 104, and the like (step 204). The EOCM 106 further takes in traffic signal data (e.g., traffic signal data, such as green, yellow, and red signal data, duration of the signal in the particular red, yellow, or green state, and the position or location of the traffic signal relative to the vehicle 101 (step 206). The EOCM 106 further receives data such as, for example, a number of or distance associated with a number of vehicles in a traffic queue to a traffic signal, a distance of the vehicle 101 to the next vehicle, and the like. This may be accomplished with an object detection sensor 102, such as a camera. Based upon the data received by the EOCM 106, the EOCM 106 calculates the distance to the traffic signal, distance to another vehicle, and the like (step 208).

The EOCM 106 further determines whether the traffic signal is in a green state and if so, execution returns to step 208, where the EOCM 106 calculates the distance to the traffic signal, including, in various embodiments, the distance to the signal less a number of vehicles in a traffic queue (step 210). However, if the traffic signal is not in a green state the EOCM 106 determines whether the traffic signal is in a red state (step 212), and if so, the EOCM 106 determines whether the time that the traffic signal has been in the red state is below a threshold amount of time (e.g., the amount of time, based upon the speed of the vehicle 101, that it would take the vehicle 101 to safely pass through the traffic signal) (step 214).

If, however, the EOCM 106 determines that the traffic signal is not in a red state, the EOCM 106 determines whether the time that the traffic signal has been in a yellow state is above a safe threshold period of time (e.g., the amount of time, based upon the speed of the vehicle 101, that it would take the vehicle 101 to safely pass through the traffic signal) (step 216). If the threshold period of time is not met, the EOCM 106 instructs the vehicle 101 to decelerate to a stop (step 218) and process 200 returns to step 210 in response to the traffic signal returning to a green state (step 220). For example, the EOCM 106 may select a deceleration method based on traffic patterns. The deceleration method may be selected from a method that changes an operating mode of the hybrid system, a method that shuts down the vehicle engine, a method that uses regenerative braking, or a method that uses tradition friction brakes. The EOCM 106 instructs the vehicle 101 based on the selected method.

If, on the other hand, the EOCM 106 determines that the time that the traffic signal has been in a yellow state is above the safe threshold period of time (meaning that the EOCM 106 has determined that the vehicle 101 can safely pass through the traffic signal), the EOCM 106 calculates a target speed that the vehicle 101 must accelerate or decelerate to safely pass through the traffic signal (step 230).

The EOCM 106 determines, based upon this calculation, whether the calculated acceleration or deceleration is within an acceptable threshold safety limit (step 232) (e.g., not above a speed limit and not below a speed that would impede traffic). If the EOCM 106 determines that the calculated acceleration or deceleration is within the threshold safety limit, the EOCM 106 instructs the vehicle 101 to accelerate or decelerate to the target speed (step 234) and the process 200 returns to step 202. If, in the event that the EOCM 106 determines that the calculated acceleration or deceleration is not within the threshold safety limit, the EOCM 106 instructs the vehicle 101 to decelerate to stop (step 236) and the process 200 returns to step 202 as the traffic signal turns green (step 238).

Returning now to step 214, and where the EOCM 106 determines that the time that the traffic signal has been in the red state is not below the threshold amount of time, the EOCM 106 calculates a speed (or deceleration) for the vehicle 101 such that the vehicle 101 will pass safely through the traffic signal (step 222). The EOCM 106 further determines whether the calculated speed or deceleration is within an acceptable or threshold safety limit (e.g., typically a predetermined amount of time) (step 224). If so, the EOCM 106 instructs the vehicle 101 to accelerate or decelerate as calculated at step 222, and the process 200 returns to step 202 (step 225). If, on the other hand, the EOCM 106 determines that the calculated speed or deceleration is not within the acceptable or threshold safety limit, the EOCM 106 instructs the vehicle 101 to stop (step 226), and the process 200 returns to step 202 in response to the traffic signal turning green (step 228).

Returning to step 210, where the EOCM 106 determines instead that a traffic signal is in a green state, the EOCM 106 determines whether the traffic signal has occupied a green state for a period of time that exceeds a safety threshold (e.g., the time that it would take the vehicle 101, moving a particular speed, to pass through the traffic signal) (step 240). Provided that the EOCM 106 determines that the vehicle 101 will be unable to pass through the traffic signal prior to the traffic signal turning yellow, the EOCM 106 instructs the vehicle 101 to decelerate to a stop (step 242) and the process 200 returns to step 202 in response to the signal turning green (step 244).

On the other hand, where the EOCM 106 determines that the period of time that the traffic signal has been green would permit the vehicle 101 to accelerate (or maintain its current speed) to pass through the traffic signal (step 246), the EOCM 106 determines whether the calculated speed is within an acceptable safety threshold (e.g., within the speed limit) (step 248), the EOCM 106 instructs the vehicle 101 to accelerate (or decelerate, or maintain speed) as appropriate to pass through the signal safely and efficiently (step 250).

Where, however, the opposite is true, and the speed is not within an acceptable safety threshold, the EOCM 106 instructs the vehicle 101 to decelerate to a stop (step 252) and the process 200 returns to step 202 in response to the traffic signal turning green (step 254).

Thus, as described herein, the system 100 gathers data, such as data collectible by the object detection sensors 102 and V2V and V1V sensors to determine an optimal solution for a vehicle 101 traveling towards a traffic signal. The solution is optimized, based upon a large variety of factors (e.g., traffic signal state, vehicle 101 performance characteristics, and the like) to maximize the vehicle 101 fuel efficiency. In other words, the system 100 automatically and adaptively adjusts vehicle 101 speeds, torques, and performance characteristics to improve fuel economy in the vehicle 101.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. An adaptive cruise control system for a vehicle, the system comprising:
   an external object calculation module (EOCM), the EOCM comprising a processor coupled to a memory and an interface, the memory including instructions for improving a fuel efficiency of the vehicle;
   a plurality of object detection sensors; and
   a communication module having a vehicle to vehicle portion (V2V) configured to sense information from at least one other vehicle in a traffic queue and a vehicle to infrastructure portion (V2I) configured to sense information from an infrastructure element, wherein the EOCM receives data indicating at least one of a state of a traffic signal, and a duration of time that a traffic signal has been in a particular state from the V2I portion and receives data indicating a number of other vehicles in the traffic queue in front of the vehicle from the V2V portion, and is configured to automatically and adaptively adjust the speed of the vehicle by selecting an acceleration or deceleration method from a plurality of methods based on an analysis of the received data to improve the fuel efficiency of the vehicle, wherein the plurality of methods includes a method that changes an operating mode of a hybrid system, a method that shuts down an engine of the vehicle, a method that uses regenerative braking, and a method that uses friction brakes.

2. The adaptive cruise control system of claim 1, the V2I further configured to determine the state of a traffic signal.

3. The adaptive cruise control system of claim 1, the V2I further configured to determine the duration of time that a traffic signal has been in a particular state.

4. The adaptive cruise control system of claim 1, the V2V portion comprising at least one of a radar, a camera, a GPS, or a sonar.

5. The adaptive cruise control system of claim 1, the EOCM further configured to communicate with at least one of a body control module, an engine control module, and a transmission control module to improve the fuel efficiency of the vehicle.

6. The adaptive cruise control system of claim 1, the EOCM further configured to communicate with at least one of a traction power inverter module and a battery state manager to improve the fuel efficiency of the vehicle.

7. An external object calculation module (EOCM) for improving the fuel efficiency of a vehicle, the EOCM comprising:
   a computer processor;
   a memory, the memory coupled to the computer processor, the memory including instructions for improving the fuel efficiency of the vehicle; and
   an interface coupled to the computer processor, wherein the computer processor is configured to receive, via the interface, information about a total number of other vehicles in a traffic queue in front of the vehicle (V2V data) and information about the state of a traffic signal (V2I data), wherein the processor is configured to process the instructions stored in the memory based upon an analysis of the V2V data and the V2I data to select an acceleration or deceleration method from a plurality of methods to improve the fuel efficiency of a vehicle within which the EOCM is situated, wherein the plurality of methods includes a method that changes an operating mode of a hybrid system, a method that shuts down an engine of the vehicle, a method that uses regenerative braking, and a method that uses friction brakes.

8. The EOCM of claim 7, the V2I data further comprising information about the distance between the vehicle to an infrastructure object.

9. The EOCM of claim 8, wherein the state of the traffic signal is one of green, yellow, or red.

10. The EOCM of claim 7, wherein the processor is configured to process the instructions based upon a duration of the state of the traffic signal to determine whether to accelerate or decelerate the speed of a vehicle to which the EOCM is coupled.

11. The EOCM of claim 7, wherein the processor is configured to process the instructions based upon a duration of the state of the traffic signal to determine whether to adjust the speed of a vehicle to which the EOCM is coupled, the state of the traffic signal being at least one of green, yellow, or red.

12. The EOCM of claim 7, the V2V data further comprising a distance between a vehicle to which the EOCM is coupled and the traffic signal.

13. The EOCM of claim 12, the distance based upon a traffic queue.

14. A process for adaptively adjusting a speed of a vehicle, the process comprising:
   receiving, by a computer processor, information about a total number of other vehicles in a traffic queue in front of the vehicle;
   receiving, by the computer processor, information about a state of the traffic signal;
   selecting, by the processor, an acceleration or deceleration method from a plurality of methods based on the total number of other vehicles in the traffic queue, wherein the plurality of methods includes a method that changes an operating mode of a hybrid system, a method that shuts down an engine of the vehicle, a method that uses regenerative braking, and a method that uses friction brakes; and
   determining, by the computer processor, whether to accelerate or decelerate the speed of the vehicle based upon the state of the traffic signal and the selected acceleration or deceleration method.

15. The process of claim 14, wherein the state of the traffic signal is one of green, yellow, or red.

16. The process of claim 14, further comprising determining, by the computer processor, whether to accelerate or decelerate the speed of the vehicle based upon a duration of time that the traffic signal has been in the state.

* * * * *